May 26, 1942.  C. K. EBERSOLE  2,284,564
FISHING SINKER
Filed July 17, 1941
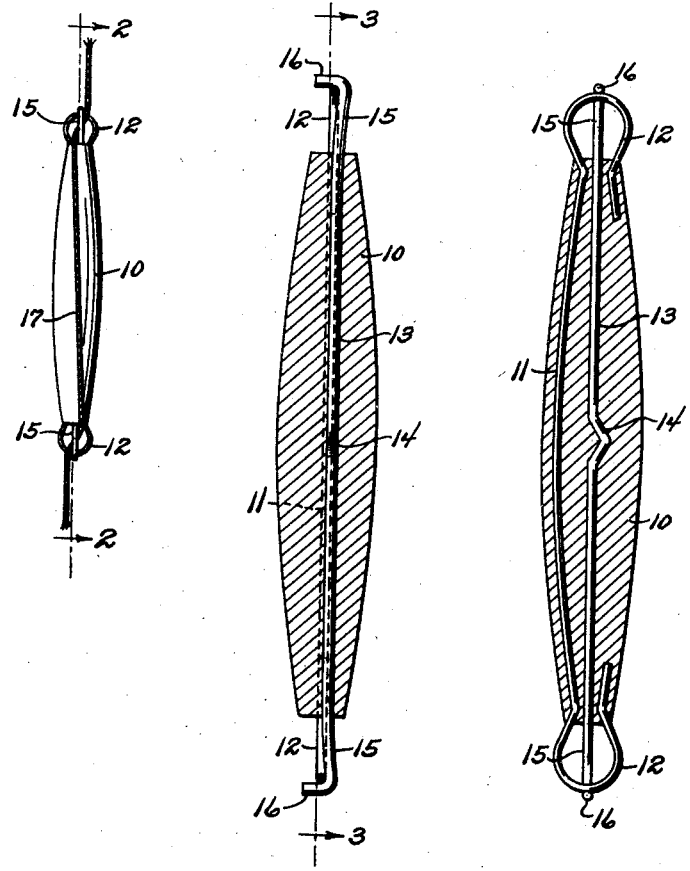
Charles K. Ebersole
INVENTOR
BY Victor J. Evans & Co.
ATTORNEYS Patented May 26, 1942

2,284,564

UNITED STATES PATENT OFFICE 2,284,564

FISHING SINKER

Charles K. Ebersole, Brainerd, Minn.

Application July 17, 1941, Serial No. 402,821

2 Claims. (Cl. 43—52)

This invention relates to fishing sinkers and has for an object to provide means for attaching the sinker to a fishing line without resorting to the end of the line, and permitting the sinker to be readily moved to adjusted positions on the line.

A further object is to provide a sinker having loops at the ends and having resilient angular clamping members extending diametrically across the loops and having the extremities hooked over the ends of the loops to permit a fishing line being inserted between the loops and the members to be clamped to the loops by the members in such manner as to frictionally hold the sinker in adjusted positions on the line.

A further object is to provide a device of this character which may be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that modifications may be resorted to within the scope of the appended claims without departing from the spirit, or sacrificing any of the advantages of the invention.

In the accompanying drawing forming part of this specification:

Figure 1 is a side elevation of a sinker constructed in accordance with the invention, applied to a fishing line.

Figure 2 is a longitudinal sectional view of the sinker, drawn to large scale, and taken on the line 2—2 of Figure 1, with the fishing line removed.

Figure 3 is a longitudinal sectional view of the sinker taken on the line 3—3 of Figure 2.

Referring now to the drawing in which like characters of reference designate similar parts in the various views, the sinker is shown to comprise an elongated weight 10 having a longitudinally extending wire 11 embedded therein and projecting from both ends of the weight. The projecting ends of the wire are formed to provide loops 12.

In carrying out the invention a single length of spring wire 13 is embedded longitudinally at the axis of the weight and is provided intermediate its ends with an offset 14 adapted to anchor the wire in the weight although this offset may be dispensed with if desired. The ends of the spring wire project beyond the opposite ends of the weight and are shaped to provide right angular hooks 15 the shanks of which pass diametrically across the loops 12 and the extremities 16 of which are hooked over the ends of the loops, see Figure 2, and extend perpendicular to the respective planes of the loops.

To apply the fishing line 17, the fishing line at spaced points is slipped underneath the extremities 16 of the hooks 15 and then passed in between the loops and the shanks of the hooks so that the fishing line is yieldably clamped at spaced points to the loops of the hooks. The sinker may be slid to various adjusted positions on the fishing line since the hooks exert spring pressure only sufficient to frictionally hold the sinker on the fishing line but permit the sinker being slid longitudinally of the fishing line without the fishing line becoming detached from the sinker.

From the above description it is thought the construction and operation of the invention will be fully understood without further explanation.

What is claimed is:

1. A fishing sinker comprising, an elongated weight, loops at opposite ends of the weight, and a wire engaged longitudinally through the weight and terminating in angular resilient ends extending diametrically across the loops and hooking over the loops for slidably clamping a fishing line to the loops.

2. The structure as of claim 1 and in which said resilient end portions are right angular in contour and the extremities thereof pass across the ends of the loops perpendicular to the respective planes of the loops.

CHARLES K. EBERSOLE.